Jan. 13, 1953  A. E. BURKHARDT  2,625,230
WHEELED MOTOR CARRYING ATTACHMENT
Filed Feb. 7, 1950
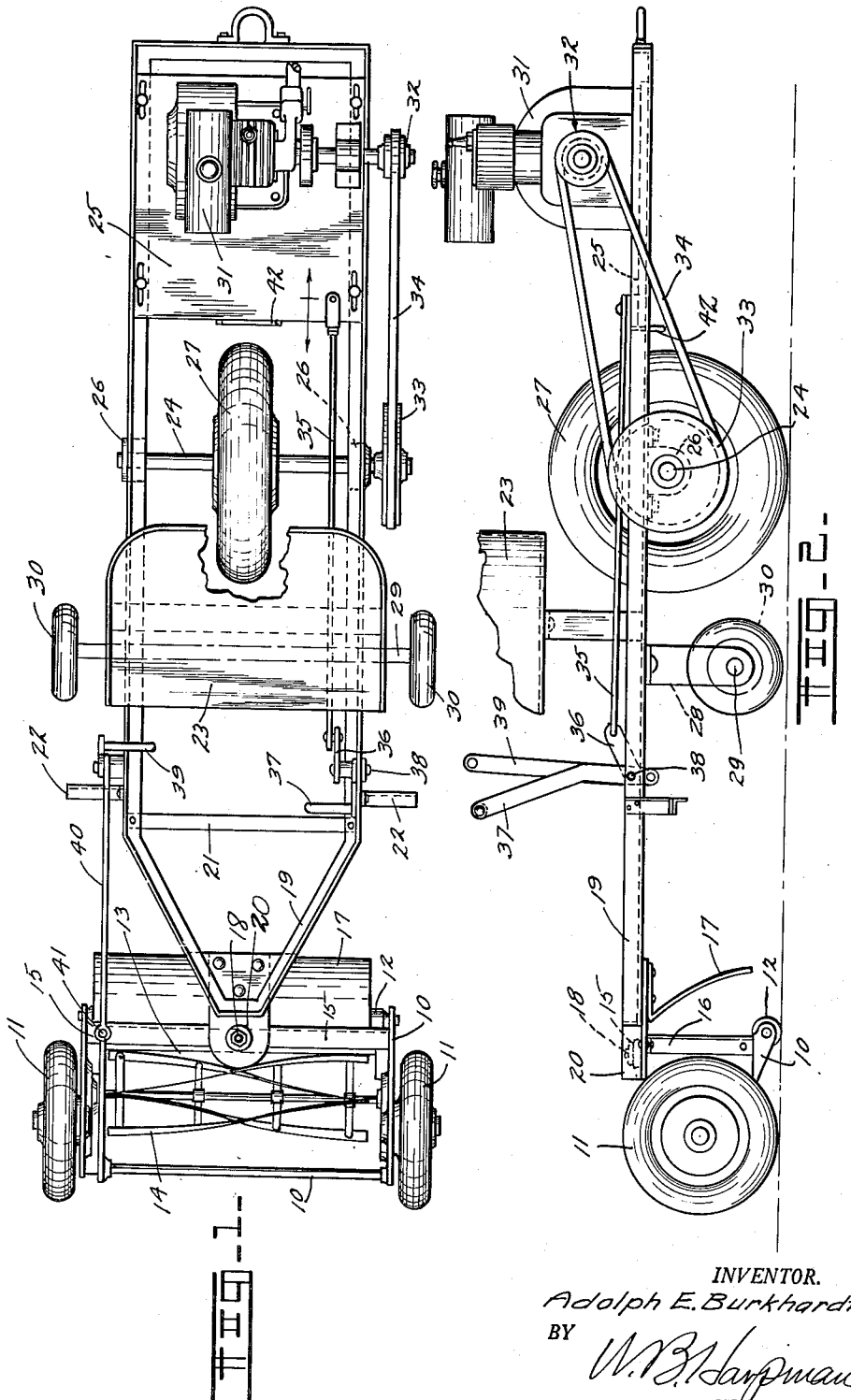
INVENTOR.
Adolph E. Burkhardt.
BY
W. B. Hartman
ATTORNEY.

Patented Jan. 13, 1953

2,625,230

UNITED STATES PATENT OFFICE 2,625,230

WHEELED MOTOR CARRYING ATTACHMENT

Adolph E. Burkhardt, Poland, Ohio

Application February 7, 1950, Serial No. 142,817

3 Claims. (Cl. 180—11)

This invention relates to lawn mowers and more particularly to a device that may be attached to a lawn mower to convert the same to a power lawn mower.

The principal object of the invention is the provision of a device for converting a lawn mower for power operation.

A further object of the invention is the provision of a simple and efficient device for driving a lawn mower and including means for moving and controlling the lawn mower.

A still further object of the invention is the provision of a device for attachment to a lawn mower, the said device including driving means, steering means and means for carrying the provision of a power lawn mower incorporating a driving wheel and means for rotating the driving wheel and braking the same.

The device for attachment to a lawn mower for converting the same for power operation as disclosed herein comprises a relatively simple and inexpensive construction capable of adaptation to almost any reel-type lawn mower whereby the same may be moved and turned as desired in cutting a lawn. The ordinary hand lawn mower as known in the art includes a stationary blade and a revolvable reel mounted on a suitable framework and carried by a pair of ground engaging wheels and a transversely positioned following roller. Ordinarily such a lawn mower is provided with a handle for manual operation.

In adapting the same for use with the invention as disclosed herein the handle is removed and a transverse frame unit substituted to provide a central pivot point through which the lawn mower is subsequently moved by the device of the invention. Additionally, a steering lever is attached to the lawn mower so that it can be steered as desired. The lawn mower actuating device disclosed herein includes novel means for driving the same and effecting the necessary clutching and braking action.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a top plan view of the power lawn mower attachment.

Figure 2 is a side view of the power lawn mower attachment.

By referring to the drawings and Figure 1 in particular it will be seen that a lawn mower unit is disclosed which includes a framework 10 supported on a pair of ground engaging wheels 11—11 and a roller 12 and includes a fixed blade 13 and a revolvable reel 14 for engagement against the fixed blade 13. As is known in the art, forward motion of the lawn mower unit rotates the wheels 11 which are geared to the reel 14 so that the same is revolved rapidly with respect to the blade 13.

In the present disclosure a secondary frame 15 is secured at the sides thereof to the framework 10. The secondary frame 15 includes a pair of vertical portions 16 and a guard 17 and a pivotal connection 18 located midway between the ends of the frame 15. The pivotal connection 18 provides means for attaching the forward end of a main frame 19 as, for example, through a trailer hitch coupling 20 to the secondary frame 15 on the lawn mower unit.

The main frame 19 is generally rectangular with the exception of the foremost end thereof which is triangular. The main frame 19 includes a transverse brace 21, a pair of transversely extending foot rests 22, a seat 23, a transverse axle 24 and a motor mounting plate 25 reciprocally positioned on the said main frame 19. The transverse axle 24 is secured to the frame 19 by means of suitable journals 26—26 and has a ground engaging wheel 27 located midway between the journals 26—26 and partly in under the seat 23. The frame 19 also has a pair of axle brackets 28 positioned thereon and depending therefrom and carrying a transverse axle 29 having a pair of outrigger wheels 30—30 thereon. Thus, the frame 19 is carried on a three-point suspension comprising the main driving wheel 27 and the outrigger wheels 30 while the foremost end of the frame 19 is carried on the lawn mower by way of the secondary frame 15 as heretofore described.

An internal combustion engine 31 is mounted on the plate 25 and its driving pulley 32 is connected with a pulley 33 on the transverse axle 24 by means of a V-belt 34. In order that the plate 25 and hence the engine 31 can be moved relative to the pulley 33 so as to tension the V-belt 34, a connecting rod 35 is attached to the plate 25 and runs forwardly along the frame 19 to a lever 36 which in turn is pivoted to the frame 19 and has an upstanding motor control arm 37 secured thereto.

By referring now to Figure 2 of the drawings it will be observed that the lever 36 and the connecting rod 35 are so arranged that when the lever 37 is moved rearwardly of the frame 19, that is, toward the plate 25 and the engine 31, the rod 35 will move the plate rearwardly and the pivotal connection of the rod 35 with the lever 36 will line up with a pivot 38 by means of which the lever 36 is pivoted to the frame 19. This effectively locks the connecting rod 35 and the lever 36 in extended position so that the plate 25 and the engine 31 thereon tension the V-belt 34 and motion is conveyed from the pulley 32 to the pulley 33 and hence the ground engaging wheel 27. The motor control arm 37 is mounted at the left side of the frame 19 and on the opposite or right side of the frame 19 there is a steering lever 39 which is connected to a steering rod 40 which in turn is pivoted at its foremost end to the secondary frame 15 at a point 41.

It will thus be seen that an operator seated on the seat 23 can control the device through the medium of the two levers 37 and 39 steering the device with the lever 39 and engaging the engine with the driving wheel through the lever 37. Additionally, the device may be stopped by moving the lever 37 forwardly so as to move the connecting rod 35 forwardly and hence the driving plate 25 and the engine 31. When this occurs a braking surface 42 is moved into engagement with the ground engaging wheel 27 and a braking action results.

It will thus be seen that a simple and efficient power lawn mower attachment has been disclosed which may be readily attached to any of lawn mower unit or may be manufactured in conjunction with a lawn mower unit particularly designed for the same. In either event, driving action is imparted to the lawn mower unit.

It will thus be apparent that the several objects of the invention have been met by the power lawn mower attachment disclosed herein.

Having thus described my invention what I claim is:

1. A device for driving a lawn mower comprising a vehicle having a longitudinally extending frame, a plate on the rear end of said frame and movable longitudinally thereof, an engine on said plate, a ground engaging wheel journaled in said frame and spaced forwardly of said engine, a pulley on and driven by said engine and a pulley secured to said ground engaging wheel, and a belt connecting said pulleys, a lever pivoted on said frame and a rod connecting said lever with said plate whereby said plate and engine may be moved rearwardly of said frame for tensioning said belt so as to drive said ground engaging wheel, a forward portion of said plate comprising a brake shoe, said brake shoe depending from said plate and registrable with and engageable by said ground engaging wheel, said plate being movable forwardly of said frame by said lever and rod whereby the brake shoe engages said ground engaging wheel and the belt tension is simultaneously released.

2. A device for driving a lawn mower and comprising a vehicle having a longitudinally extending frame, a coupling at the forward end of said frame for attachment to said lawn mower, a driving wheel intermediate the ends of said frame and midway between the sides thereof, an engine mounted on the rear end of said frame for longitudinal movement thereof, said engine longitudinally spaced from said wheel, a brake shoe secured to said engine and depending therefrom and in longitudinal alignment with and adapted to be engaged by said driving wheel, a pulley on and driven by said engine and a pulley rigidly secured to said wheel and an endless belt interconnecting said pulleys, and means for bodily moving said engine and brake shoe toward and away from said driving wheel.

3. The device for driving a lawn mower as set forth in claim 2 and wherein the means for bodily moving the engine and brake shoe comprises a mounting plate movable longitudinally of the said vehicle, the engine and brake shoe being mounted connected to said plate and a lever on said frame connected to said rod for moving the same and said plate and engine and brake shoe longitudinally of the said vehicle.

ADOLPH E. BURKHARDT.

REFERENCES CITED

The following references are of record in the file of this patent:

UNITED STATES PATENTS

| Number | Name | Date |
|---|---|---|
| 787,952 | Slater | Apr. 25, 1905 |
| 1,463,097 | Schneider | July 24, 1923 |
| 2,082,600 | Squires et al. | June 1, 1937 |
| 2,359,642 | Hayes | Oct. 3, 1944 |
| 2,465,567 | Atwood | Mar. 29, 1949 |
| 2,479,015 | McHugh | Aug. 16, 1949 |